UNITED STATES PATENT OFFICE.

GEORGE D. BURTON, OF BOSTON, MASSACHUSETTS, ASSIGNOR TO THE BURTON COMPANY, OF BOSTON, MASSACHUSETTS, A CORPORATION OF MASSACHUSETTS.

PROCESS OF PREPARING VEGETABLE FIBERS.

1,115,500.   Specification of Letters Patent.   Patented Nov. 3, 1914.

No Drawing. Original application filed March 27, 1913, Serial No. 757,078. Divided and this application filed April 6, 1914. Serial No. 830,093.

*To all whom it may concern:*

Be it known that I, GEORGE D. BURTON, a citizen of the United States, residing at Boston, in the county of Suffolk and State of Massachusetts, have invented an Improvement in Processes of Preparing Vegetable Fibers, of which the following is a specification.

In the treatment of fibrous material, such as flax, ramie, sisal, hemp, jute and other kinds of straws and grasses, to adapt them for use in the arts, they have been degummed, or more strictly speaking, partially degummed. The gummy substance which is removed is the natural binder which holds together the tiny fibers and when eliminated the fibers become separated so that the degummed fibrous material lacks some of its natural adhesive properties.

The invention forming the subject matter of my application #757,078, filed March 27, 1913, of which this application is a division, relates to the treatment of fibrous materials such as above referred to, after they have been degummed, by subjecting them to a treatment involving the employment of an oil, a grease, or in fact any oily substance, either animal, vegetable or mineral, which is added to the degummed fibrous materials to take the place of the gummy substance which has been removed by the degumming process, thereby restoring said materials more nearly to their natural state, and giving to them the feel and strength and many of the general characteristics of wool, etc. As the degummed material which is to be treated is of a vegetable origin, a vegetable oil is preferably employed.

One way of carrying out said invention, which is very simple and economical and productive of good results, is here given as an example, but said invention is not limited to this way or to the order of the several steps, as it may be modified and still come within its spirit and scope.

The oily substance having been selected, and which may be olive-oil, for instance, is partially saponified by a weak saponifying agent, preferably one that is volatile, such as ammonia, the saponification being carried only so far or continued only so long as to cut the oil and break it up to minute globules, or particles, but not entirely destroy the globules or particles, and such partially saponified oil is mixed with water and forms an emulsion, the water serving as a carrier for the oily particles, in which said particles are suspended. If saponification was carried further the product would be a soap, and the globules or particles of oil too much broken up would be destroyed, and would not produce the results sought. The emulsion thus produced may consist of say one pound to five pounds more or less of olive-oil, one-half pound of 26% ammonia, and ten gallons of soft water. The degummed fibrous material is then treated with this emulsion, in the presence of the minute oily particles therein contained, whereupon it absorbs them, at least to a certain extent. More water may be added to the solution if necessary. If the emulsion is contained in an agitator and the fibrous material submerged therein, the process will be expedited, as the emulsion will more quickly reach all parts of the fibrous material. In fact, in the practice of my process a revoluble agitator is preferred, similar to that shown and described in Letters Patent issued to me #976,779, dated November 22, 1910, but any other form of agitator may be employed, so that a detailed description of the same is unnecessary. The emulsion may be maintained at about room temperature, as such temperature is conducive to the ready evaporation of the ammonia. The fibrous material need be submerged only for a short period of time, as it rapidly absorbs the emulsion, the oily particles being carried freely into and incorporated with the fibers. When the ammonia evaporates the partially saponified oil alone is left to be absorbed by the fibers. As a result the fibers are given an increased strength, longer durability and are capable of a much finer, smoother and evener finish when subsequently spun into a yarn or other article of manufacture. The substitution of an oil or equivalent substance for the gummy substance which has been removed is a very valuable, essential and important step in preserving the lasting qualities of the fiber and yarns and other articles of manufacture.

which may be made of the fibers. The fibrous material thus treated also passes through the various machines by which it is made into articles of manufacture, to much better advantage than the ordinary degummed fibrous material. The emulsion has a tendency to give to the fibrous material more nearly its natural color as used in the arts.

My present invention has for its object to treat the fibrous material, so as to obtain the results heretofore described and in addition thereto to bleach or whiten the same; and consists in adding to the aforesaid emulsion an acid, preferably one having a vegetable base, such as oxalic acid, (Norwegian), thereby giving to the emulsion qualities by which this result may be attained. In the example heretofore described, eight ounces of oxalic acid (Norwegian), may be added to the emulsion after partial saponification has taken place and the oily particles are thus held in suspension. The acid treated emulsion thus described performs the functions of softening, strengthening, oiling and also bleaching or whitening the fibrous material, and the fibrous material treated by it does not deteriorate with age, and the manufactured products will attain a good gloss and finish, yet all of these results may be accomplished by the treatment during a single operation.

When fibrous material such as flax is not entirely degummed, as is ordinarily the case by the usual degumming process, and the partially degummed material is made into binder twine, certain insects attack the twine and subsist upon it and cause it to become weakened and to break, hence the use of the ordinary degummed flax for binder-twine is practically prohibitive. Another reason detrimental to its use is that the gum dulls the cutting devices on the binding-machine, and also is deposited on them, impairing their efficiency. So also its use for many other purposes is very limited, but by my treatment it is restored to a condition approximately its natural state, as regards its strength and quality, and in addition thereto may be bleached or whitened. In case of flax-straw, grown for flax-seed, from which linseed-oil is made, the linseed-oil is naturally of an oily character and after the flax-straw has been degummed then linseed-oil in its natural state may be added to advantage to restore the degummed flax-straw to a condition which makes it very useful in the arts. In such cases the linseed-oil may be added to the fibrous product by a frictional method instead of by partial saponification, as for instance, the oil may be heated to a proper temperature, say about 70° F. which liquefies it to such an extent as to admit of its flowing readily, and in this condition it may be added in the form of spray to the fibrous material while the latter is being agitated in a revoluble or other form of agitator. So also other oily substances may be added to the fibrous material in this way, it being divided into minute particles by a mechanical action in the form of a spray instead of by a partial saponification if desired. In such instances an acid may be added to the oily substance for the purpose of bleaching or whitening the fibrous material.

I claim:—

1. The process of treating degummed fibrous material which consists in subjecting the fibrous material to the contact of minute particles of an oily substance and an acid.

2. The process of treating degummed fibrous material which consists in agitating the fibrous material in the presence of minute particles of an oily substance and an acid.

3. The process of treating degummed fibrous material which consists in dividing an oily substance into minute particles in a liquid carrier, adding thereto an acid, and submerging the fibrous material in said carrier in the presence of the particles suspended therein and agitating the same.

4. The process of treating degummed fibrous material which consists in partially saponifying an oily substance with an alkaline saponifying agent and adding thereto an acid, and then subjecting the fibrous material to the action of the same.

5. The process of treating degummed fibrous material which consists in partially saponifying an oily substance with an alkaline saponifying agent, adding thereto an acid having a vegetable base, and then subjecting the fibrous material to the action of the same.

6. The process of treating degummed fibrous material which consists in partially saponifying an oily substance with a volatile alkaline saponifying agent, adding thereto an acid and then subjecting the fibrous material to the action of the same.

7. The process of treating degummed fibrous material which consists in forming an emulsion of an oily substance with water and a saponifying agent, and adding thereto an acid and submerging the fibrous material therein.

8. The process of treating degummed fibrous material which consists in forming an emulsion of an oily substance with water and a volatile saponifying agent and adding thereto an acid and submerging the fibrous material therein.

9. The process of treating degummed fibrous material which consists in forming an emulsion of an oily substance with water and ammonia and adding thereto an acid and submerging the fibrous material therein.

10. The process of treating degummed fibrous material which consists in forming an emulsion of an oily substance with water and ammonia and adding thereto an acid with a vegetable base and submerging the fibrous material therein.

In testimony whereof, I have signed my name to this specification in the presence of two subscribing witnesses.

GEO. D. BURTON.

Witnesses:
E. F. PHILIPSON,
FRANKLIN P. SIMONDS.